(12) United States Patent
Choquette et al.

(10) Patent No.: US 10,979,365 B1
(45) Date of Patent: Apr. 13, 2021

(54) ACCELERATED STARTUP OF SATELLITE HIGH-BANDWIDTH COMMUNICATION SESSIONS

(71) Applicant: Hughes Network Systems, LLC, Germantown, MD (US)

(72) Inventors: George Choquette, Potomac, MD (US); Vivek Gupta, Clarksburg, MD (US); Rushi Kaw, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/731,339

(22) Filed: Dec. 31, 2019

(51) Int. Cl.
| | | |
|---|---|---|
| G06F 13/00 | (2006.01) | |
| H04L 12/911 | (2013.01) | |
| H04B 7/185 | (2006.01) | |
| H04B 7/19 | (2006.01) | |
| H04L 12/26 | (2006.01) | |
| H04L 29/08 | (2006.01) | |
| H04L 12/927 | (2013.01) | |
| H04L 12/807 | (2013.01) | |

(52) U.S. Cl.
CPC ....... *H04L 47/826* (2013.01); *H04B 7/18517* (2013.01); *H04B 7/18528* (2013.01); *H04B 7/19* (2013.01); *H04L 43/028* (2013.01); *H04L 47/27* (2013.01); *H04L 47/803* (2013.01); *H04L 67/02* (2013.01); *H04L 67/14* (2013.01)

(58) Field of Classification Search
CPC ..... H04L 47/826; H04L 43/028; H04L 67/14; H04L 47/803; H04L 47/27; H04L 67/02; H04B 7/18517; H04B 7/18528; H04B 7/19

USPC ................. 709/220–222, 227, 228, 230–235
See application file for complete search history.

(56) References Cited

U.S. PATENT DOCUMENTS

| | | | | |
|---|---|---|---|---|
| 10,425,306 | B2* | 9/2019 | Ho ...................... | H04L 43/0835 |
| 10,432,299 | B2* | 10/2019 | Ravishankar ...... | H04B 7/18584 |
| 2010/0188992 | A1* | 7/2010 | Raleigh ................. | G06Q 20/40 |
| | | | | 370/252 |
| 2010/0188994 | A1* | 7/2010 | Raleigh .............. | G06Q 30/0284 |
| | | | | 370/252 |
| 2010/0188995 | A1* | 7/2010 | Raleigh ................ | H04M 15/00 |
| | | | | 370/252 |
| 2010/0191846 | A1* | 7/2010 | Raleigh ................ | H04W 12/08 |
| | | | | 709/224 |
| 2017/0294957 | A1* | 10/2017 | Ravishankar ...... | H04B 7/18584 |

(Continued)

*Primary Examiner* — Kenneth R Coulter
(74) *Attorney, Agent, or Firm* — Kilpatrick Townsend & Stockton LLP (57) ABSTRACT

Various arrangements for increasing a transfer rate of a data transfer via satellite are presented. A satellite gateway may set an accelerated set of communication parameters that control communication between the satellite gateway and the satellite terminal via the satellite and between the satellite gateway and the content source to an accelerated transfer rate between the content source and the satellite terminal. A first set of data may be transferred from the content source to the satellite terminal using the set of communication parameters. After transferring the first set of data, the satellite gateway may adjust the initial set of communication parameters to an adjusted set of communication parameters. The adjusted transfer rate can be lower than the accelerated transfer rate.

20 Claims, 6 Drawing Sheets

(56) References Cited

U.S. PATENT DOCUMENTS

2018/0254966 A1* 9/2018 Ho ..................... H04L 43/0835
2019/0074894 A1* 3/2019 Gopal ................ H04B 7/18513

* cited by examiner

ACCELERATED STARTUP OF SATELLITE HIGH-BANDWIDTH COMMUNICATION SESSIONS

BACKGROUND

Due in part to the amount of time that electromagnetic radiation takes to propagate through space, delays in communication involving a geosynchronous satellite are inevitable. For instance, communication from a terminal, up to a satellite, and down to a satellite gateway may result in approximately 260 ms of delay, with a round trip and associated processing resulting in 600 ms of delay.

For some types of data transfers, this delay may be compounded. For instance, to initiate a communication connection, data may need to be exchanged between a source and a destination multiple times. Therefore, the approximate 600 ms round trip and processing delay may be compounded two or more times, resulting in a 2-4 second delay before the data payload is transmitted.

Such an arrangement can result in a negative end-user experience. If the end-user is expecting particular transfer rate, the user may be frustrated when the initial transfer speed appears to be significantly slower than expected. Further, regardless of the end-user experience, if multiple sets of data are to be transferred to a terminal, repeated setting up of communication connections can result in low transfer rates even when the connection has significant bandwidth.

SUMMARY

Various arrangements, including systems and methods, are presented for increasing a transfer rate of a data transfer via satellite. Characteristics of data to be transmitted from a content source accessible via the Internet to a satellite terminal may be analyzed. It can be determined that a type of data service corresponding to the characteristics of the data qualifies for an accelerated startup. In response to determining that the type of data qualifies for the accelerated startup, an accelerated set of communication parameters may be set that control communication between the satellite gateway system and the satellite terminal via the satellite and between the satellite gateway and the content source to achieve an accelerated transfer rate between the content source and the satellite terminal. A first set of data may be transferred from the content source to the satellite terminal using the accelerated set of communication parameters. After transferring the first set of data, the accelerated set of communication parameters can be adjusted to an adjusted set of communication parameters that control communication between the satellite gateway and the satellite terminal via the satellite and between the satellite gateway and the content source to decrease the accelerated transfer rate between the content source and the satellite terminal. The adjusted set of communication parameters can achieve a predefined transfer rate mapped to the satellite gateway. The predefined transfer rate can be lower than the accelerated transfer rate. A second set of data can be transferred from the content source to the satellite terminal using the adjusted set of communication parameters.

Embodiments of such systems and methods can include one or more of the following features: The accelerated set of communication parameters can include one or more parameters such as a data transmission window size, one or more buffer sizes, a queue service rate, a rate of scheduling packets or bytes from one or more queues, or one or more queue scheduling weights. The accelerated set of communication parameters can include a larger data transmission window size for the accelerated transfer rate and the adjusted set of communication parameters comprises a smaller data transmission window size. The accelerated set of communication parameters that control communication at the accelerated transfer rate may be active for a predefined period of time prior to adjusting the accelerated set of communication parameters. A maximum available transfer rate may be determined based on network congestion experienced by the satellite gateway. The accelerated set of parameters may be at least partially determined based on the determined maximum available transfer rate. An amount to decrease the determined maximum available transfer rate may be determined based on a quality of communication path between the satellite and the satellite terminal, wherein the accelerated set of parameters is at least partially determined based on the determined amount to decrease the determined maximum available transfer rate. The type of data service may be selected from the group consisting of: a streaming video service; a streaming audio service; a data transfer rate test service; and a file download service. Analyzing characteristics of data to be transmitted from the content source accessible via the Internet to the satellite terminal can include performing deep packet inspection (DPI). Adjusting the accelerated set of communication parameters to the adjusted set of communication parameters can include performing a multi-step transition process that performs multiple step-based adjustments over time to the accelerated set of communication parameters to set the adjusted set of communication parameters. At least three separate communication connections can be present, the at least three separate communication connections including: a first TCP connection between a user terminal and the satellite terminal; a second communication connection between the satellite terminal and the satellite gateway via the satellite; and a third TCP connection between the satellite terminal and the content source accessible via the Internet.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In order to overcome the propagation delays inherent in satellite-based communication, one or more actions may be taken to modify how communication is performed between a terminal, satellite gateway system, and a content source that is accessible via the Internet. Parameters of the communication link established between the terminal, satellite gateway system, and a content source can be set to counteract effects of propagation delay and initiating a communication link on an initial transfer rate. After a period of time, such as several seconds, the parameters may be adjusted to achieve a transfer rate that approximately matches a transfer rate promised to an end user (e.g., in a user service agreement).

For certain types of data for which a user may be highly-sensitive to an initial low-rate of data transfer, a determination may be made by a satellite gateway system that the data connection being established qualifies for an "accelerated" or "boosted" transfer rate. A determination may then be made as to a greatest possible transfer speed due to network conditions and communication link conditions (e.g., between the satellite terminal and the satellite gateway system via satellite). Parameters of one or more communication links, such as a first communication link between a satellite terminal and the satellite gateway system via the satellite and a second communication link between the satellite gateway system and a content source may be established that allow for an accelerated transfer rate. For example, these parameters may include a definition of an increased data window size to increase the amount of data that can be transferred from the content source to the satellite gateway system before an acknowledgement needs to be transmitted to the content source by the satellite gateway system. After a period of time, the parameters may be adjusted to slow the transfer rate.

The accelerated burst transmission that involves a higher transfer rate may help counteract the initial delay in starting the transfer due to propagation delays, buffering, and handshaking. From a user's perspective, the accelerated burst transmission may help the user perceive the transmission of data of being at least as good as a transfer rate expected by the user. A user may be less sensitive to having the data rate of the accelerated burst transmission scaled back since once the data is being actively received by the user's device, the propagation delays may be less noticeable and measurement of the transfer rate may be based on a consistent data transfer and may not factor in the initial propagation delay, buffering, and/or handshaking.

Figure 1:
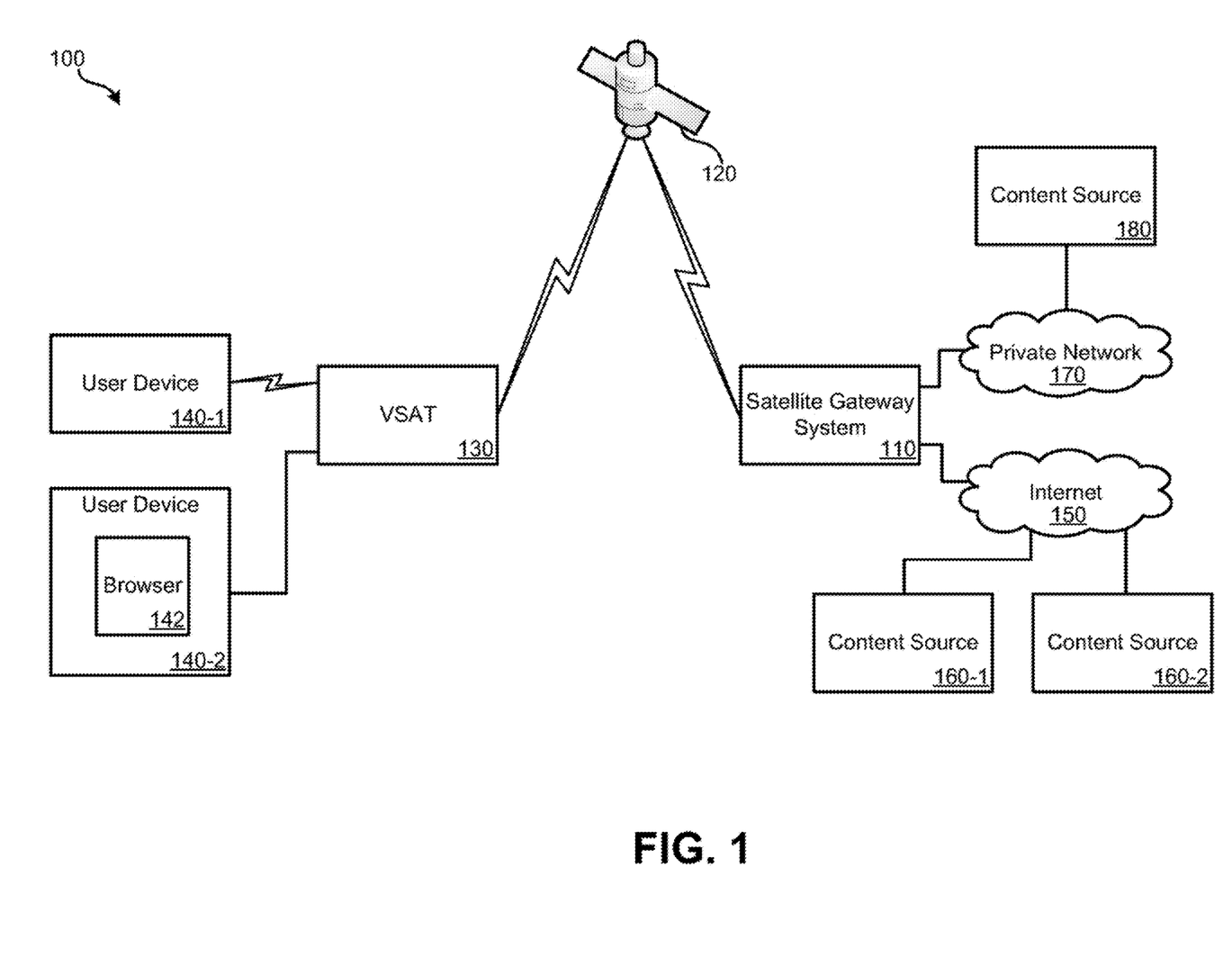
FIG. 1 illustrates an embodiment of a satellite-based Internet access system.

FIG. 1 illustrates an embodiment of a satellite-based Internet access system 100, referred to herein as "system 100." System 100 can include: satellite gateway system 110; satellite 120; very small aperture terminal (VSAT) 130; user devices 140; the Internet 150; content sources 160; private network 170; and content source 180.

Satellite gateway system 110 may serve as a gateway between one or more networks and a satellite communication link with multiple satellite terminals. Selected detail regarding the componentry of satellite gateway system 110 as applicable to this invention is provided in relation to FIG. 3. Other necessary components are not shown, including modulators, demodulators, antenna, and so on. Further, the satellite gateway system 100 components might reside in a single location, or be distributed across multiple locations (e.g., for antenna, modems, data processing and management). Satellite gateway system 110 may communicate with one or more satellites, such as satellite 120. Satellite 120 may be a geosynchronous satellite, and therefore may be located approximately 35,786 km above sea-level at the Earth's equator. Satellite 120 may relay data between various satellite terminals, such as VSAT 130, and satellite gateway system 110. Therefore, data may be transmitted by VSAT 130 to satellite gateway system 110 via satellite 120 and from satellite gateway system 110 to VSAT 130 via satellite 120. Due to propagation delays of electromagnetic radiation, there is inherent delay in communication between VSAT 130 and satellite gateway system 110 via satellite 120.

VSAT 130 can be a very small aperture terminal, meaning a small dish antenna or phased array antenna may be pointed toward satellite 120. A satellite modem may be in communication with the satellite dish or phased array antenna. The satellite modem may serve to receive from and transmit data to one or more user devices. Therefore, for example, a single VSAT 130 may be present for a household or community and may serve to link various user devices 140 with satellite gateway system 110. In other embodiments, VSAT 130 may be some other form of satellite terminal that serves as a link between user devices 140 and satellite 120.

User devices 140 can refer to any form of wired or wireless device that is used to access data services. For example, user device 140-1 may be a wireless device that communicates with VSAT 130 for telecommunication services, Internet access, or some other form of data service. Such wireless devices can include: tablet computers, laptop computers, desktop computers, smart phones, smart televisions, gaming devices, or any wireless computerized device used to access data services. User device 140-2 may be a wired device that is connected directly to VSAT 130 or to a router or other form of access point that is connected with VSAT 130. For example, user device 140-2 may be a desktop computer that uses a LAN connection to access data services, such as Internet access, via VSAT 130. An application, such as Internet browser 142 may be executed by the user device, such as user device 140-2. Internet browser 142 may access Internet 150 or private network 170 via VSAT 130, satellite 120, and satellite gateway system 110. Internet browsers may also be executed by wireless user devices, such as user device 140-1.

Satellite gateway system 110 may be in communication with Internet 150. Therefore, satellite gateway system 110 serves as a gateway between Internet 150 and various satellite terminals that communicate with satellite gateway system 110 via satellite 120 and/or one or more other satellites. Through Internet 150, user devices 140 may be able to access whatever content is desired. For example purposes only, connectivity to possible content sources 160 accessible via Internet 150 are illustrated in FIG. 1. Content sources 160 may provide various forms of services to user devices 140. As examples, content sources 160 can include: video streaming sources; audio streaming sources; file downloads; webpages; Internet speed tests; and smart home services.

Additionally or alternatively, satellite gateway system 110 may serve as a gateway between satellite terminals and one or more private networks, such as private network 170. Private network 170 may provide access to one or more content sources unavailable via the Internet. For instance, private network 170 may be a corporate LAN. As an example, content source 180 is illustrated as only accessible via private network 170. In some embodiments, satellite gateway system 110 may communicate with private network 170 via Internet 150. Content source 180 may be used to provide similar forms of services as content sources 160, such as: video streaming sources; audio streaming sources; file downloads; webpages; Internet speed tests; and smart home services.

Figure 2:
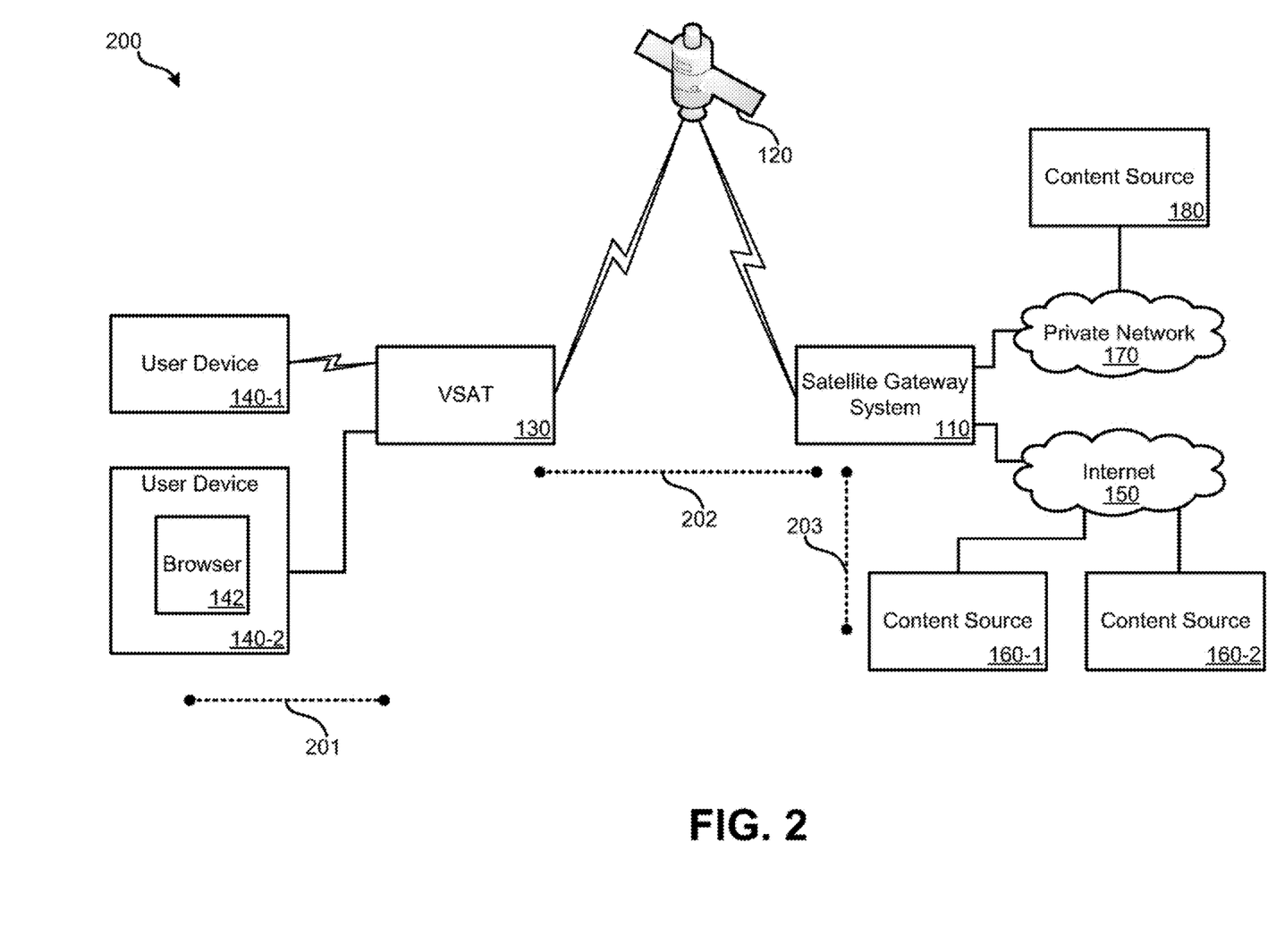
FIG. 2 illustrates an embodiment of a satellite-based Internet access system using three communication connections.

FIG. 2 illustrates an embodiment of a satellite-based Internet access system 200 using three communication connections. Satellite-based Internet access system 200 can represent an embodiment of system 100. In order to enable communication between user devices 140 and content sources, such as content sources 160, multiple communication connections may be established. Due at least in part to delays in propagation between VSAT 130, satellite 120, and satellite gateway system 110, it may be beneficial to establish multiple communication links rather than a single communication link from, for example, user device 140-1 to content source 160-1.

A first communication connection (illustrated by dotted line 201) may be established between user device 140-1 and VSAT 130. This first communication connection may be a conventional TCP (transmission control protocol) connection. Due to the short distance between user device 140-1 and VSAT 130, propagation delays may be insignificant. Handshaking and establishment of the communication connection between user device 140-1 and VSAT 130 may account for little of the initial latency in obtaining data from content source 160-1.

A second communication connection (illustrated by dotted line 202) may be established between VSAT 130 and satellite gateway system 110 via satellite 120. Due to the significant propagation delays inherent in communication via satellite, especially via geosynchronous satellite, the second communication connection may be handled differently than the first communication connection or third communication connection. Specifically, a proprietary or modified version of TCP may be used for communication between VSAT 130 and satellite gateway system 110 which may allow for reduced overhead (e.g., a reduced amount of handshaking, acknowledgments, and/or suppression of certain data bits) between satellite gateway system 110 and VSAT 130. Buffering may be used at VSAT 130 and satellite gateway system 110 to facilitate the exchange of data being transmitted between the first and second communication connections. Therefore, for example when data is received via the second communication connection, the data may be briefly buffered by VSAT 130 then transmitted via the first communication connection to the appropriate user device. Such buffering may be performed in both uplink data (being transmitted by a user device to satellite gateway system 110) and downlink data (being received by a user device from satellite gateway system 110).

A third communication connection (illustrated by dotted line 203) may be established between satellite gateway system 110 and the content source that is to provide data to the user device, such as content source 160-1. The third communication connection may be established as a conventional TCP connection. Buffering may be used at satellite gateway system 110 to facilitate the exchange of data being transmitted between the second and third communication connections. Therefore, for example when data is received via the third communication connection by satellite gateway system 110, the data may be briefly buffered by satellite gateway system 110 then transmitted via the second communication connection to VSAT 130. Such buffering may be performed for both uplink data and downlink data.

Figure 3:
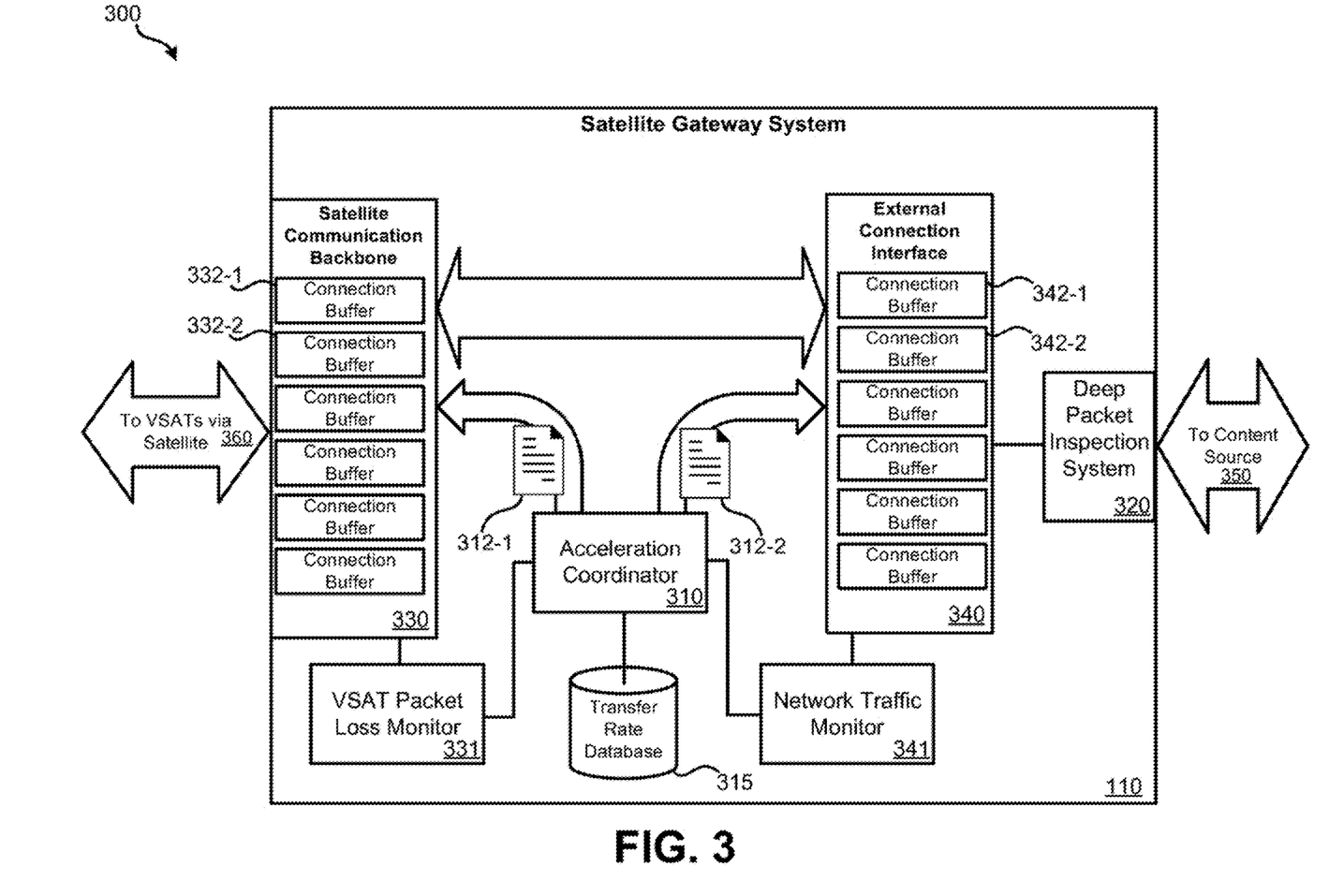
FIG. 3 illustrates an embodiment of a satellite gateway system.

FIG. 3 illustrates an embodiment of satellite gateway system 300. Satellite gateway system 300 includes an embodiment of satellite gateway system 110 present in FIGS. 1 and 2. Satellite gateway system 110 can include various components, including: acceleration coordinator 310; transfer rate database 315; deep packet inspection system 320; satellite communication backbone 330; and external connection interface 340. Other necessary components such as modulators, demodulators, antenna, management systems and the like, are not shown to maintain simplicity of the figure.

The various components of satellite gateway system 110 may include one or more processors and one or more non-transitory processor readable mediums. For instance, functionality of acceleration coordinator 310 may be implemented using one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Satellite communication backbone 330 may serve as an interface between satellite gateway system 110 and satellite 120. Satellite communication backbone 330 can be understood as a terminus of the second communication connection type illustrated by dotted line 202. Data that is being transmitted to the satellite or received from the satellite via the proprietary or modified version of TCP may be buffered on a connection-by-connection basis using connection buffers 332. For instance, for a communication session between a particular content provider and a VSAT, connection buffer 332-1 may be used to temporarily store data that is about to be transmitted via the second communication connection to a VSAT, such as VSAT 130.

Connection buffer 332-2 may be used to temporarily store data that has been received via the second communications connection from the VSAT for a different communication session with another content provider. While six connection buffers are illustrated as part of satellite communication backbone 330, it should be understood that the illustrated number of buffers is arbitrary. The number of connection buffers may be varied based on the number of active communication sessions between various VSATs and content sources, or the different classes of service to be prioritized between the VSAT and the satellite gateway system. The second communication connection type is illustrated by bidirectional arrow 360. Therefore, via the second communication connection type, data may be sent to VSATs and may be received from VSATs by satellite gateway system 110.

External connection interface 340 may serve as an interface between satellite gateway system 110 and content sources available via the Internet and/or one or more private networks. External connection interface 340 can be understood as a terminus of the third communication connection illustrated by dotted line 203. Data that is being transmitted by satellite gateway system 110 to an external content source or received by satellite gateway system 110 may be buffered on a connection-by-connection basis using connection buffers 342. For instance, for a communication session between a particular content source and the satellite gateway system (on behalf of a particular VSAT), connection buffer 342-1 may be used to temporarily store data that is to be passed to satellite communication backbone 330 to be transmitted via the second communication connection to a VSAT, such as VSAT 130. Connection buffer 342-2 may be used to temporarily store data that has been received from satellite communication backbone 330 and is to be transmitted to a content source for a different communication session. While six connection buffers 342 are illustrated as part of external connection interface 340, it should be understood that the illustrated number of buffers is arbitrary. The number of connection buffers may be varied based on the number of active communication sessions with various content sources. Communication connections that are part of the third communication connection type, which are performed using TCP sessions, are illustrated by bidirectional arrow 350. Therefore, via the third communication connection type, data may be exchanged between satellite gateway system 110 and various content sources.

Each connection buffer of satellite communication backbone 330 may have a corresponding connection buffer in external connection interface 340. Therefore, data may be exchanged between, for example, connection buffer 332-1 and connection buffer 342-1. More than one connection buffer of external connection interface 340 may map to one connection buffer of satellite communication backbone 330. Between when data is exchanged between external connection interface 340 and various content sources and when data is exchanged between satellite communication backbone 330 and various VSATs, the data may be analyzed. Deep packet inspection system 320 may be used to analyze data transmitted between VSATs and content sources to determine the type of service being performed. For instance, deep packet inspection system 320 may be configured to detect video streaming services, audio streaming services, file downloads, and speed test services. Deep packet inspection system 320 may be maintained by a third party that periodically or occasionally updates deep packet inspection system 320 for more accurate identification of packets. Indications of the type of data being exchanged (or about to be exchanged) between VSATs and content sources may be determined by deep packet inspection system 320 and provided to acceleration coordinator 310.

Deep packet inspection system 320 may functionally reside between external connection interface 340 and content source 350. In such embodiments, deep packet inspection system 320 may pass data to acceleration coordinator 310. In other embodiments, deep packet inspection system 320 may reside elsewhere in satellite gateway system 110, such as between satellite communication backbone 330 and external connection interface 340.

Acceleration coordinator 310 may perform multiple functions. Acceleration coordinator 310 may determine whether, based on the type of data identified by deep packet inspection system 320, whether a data transfer between a VSAT and a content source is eligible for accelerated startup. Acceleration coordinator 310 may be configured such that only new connections for particular types of data services may be eligible for accelerated startup. For example, the data services eligible for accelerated startup may include: video streaming, file downloads, audio streaming, and Internet speed tests (i.e., tests that provide a user with an indication of the speed of his Internet connection). If a particular data service is being initiated and qualifies, acceleration coordinator 310 may set connection parameters of the second communication connection (between the VSAT and the satellite gateway system) and the third communication connection (between the satellite gateway system and the content source). The connection parameters may control how the connection functions. For example, a data window size may detail the amount of data that may be transmitted to a destination before the destination returns an acknowledgement to the source. The data window size may be increased for both the second communications connection and the third communication connection to allow for a greater amount of data to be transmitted from the content source to the VSAT. Additionally or alternatively, one or more other parameter types may also be adjusted to accelerate the data transfer. For example, a scheduling rate, priority, or number of packets. The scheduling rate controls how often data is pulled from the connection buffers 342 and/or connection buffers 332. The priority controls the order in which the connection buffers (such as 332-1 and 332-2 etc. and/or 342-1 and 342-2 etc.) are serviced. The number of packets controls how many packets are pulled from the connection buffers 342 and/or 332 in each scheduling cycle. The parameters used to configure the second communication connection and the third communication connection are illustrated as parameter sets 312-1 and 312-2, respectively.

Specifically, referring to scheduling, when acceleration is to be performed, more opportunities for data to be transmitted may be provided. For example, if a round robin scheduling arrangement is present, packets may be transmitted to various satellite terminals in turn. However, for an accelerated startup data transmission, multiple opportunities may be given in the round robin scheduling arrangement such that the satellite terminal being provided accelerated startup has more timeslots in a schedule cycle allocated to its data transmissions.

Acceleration coordinator 310 may also decrease the transfer rate associated with the accelerated startup after a predetermined time period. For instance, the predetermined time period may be set to between 1 and 10 seconds. In some embodiments, the predetermined time period may vary based on the detected data service by deep packet inspection system 320. For instance, for a first data service, the predetermined time period may be between 1 and 10 seconds for a second data service, the time period may be between 2 and 20 seconds. After the predetermined time period has expired, acceleration coordinator 310 may alter parameter sets 312-1 and 312-2 one or more times. For instance, parameter sets 312-1 and 312-2 may be modified to step down the data window size permissible for each communication connection. The data window size that is permissible for each communication connection may be stepped down until a transfer rate is realized that matches or approximately matches a QoS transfer rate associated with the service plan with which the VSAT is associated in transfer rate database 315.

Transfer rate database 315 may indicate a QoS transfer rate that has been set for each VSAT serviced by satellite gateway system 110. For example, when a person subscribes to a satellite-based Internet service, the person may purchase a subscription that promises a QoS transfer rate. The accelerated transfer can be set to operate at much above the QoS transfer rate. After the predetermined time period has expired, various parameters of the second and third communication connections may be adjusted until the transfer rate approximately matches the QoS transfer rate.

VSAT packet loss monitor 331 and network traffic monitor 341 may provide information to acceleration coordinator 310 that is used to determine the parameters used during the accelerated transfer. VSAT packet loss monitor 331 may monitor the communication link quality, between the satellite gateway system 110 and the specific VSAT for which an accelerated transfer may be performed, based on the current forward channel ACM (Adaptive Coding and Modulation) Modcod value for the VSAT or a number of packets lost on the communication link or the type of VSAT. Network traffic monitor 341 may monitor the amount of network traffic being experienced by satellite gateway system 110 via external connection interface 340 and with other VSATs via satellite. Based on the amount of packet loss determined by VSAT packet loss monitor 331 and the amount of network traffic identified by network traffic monitor 341, acceleration coordinator 310 can determine the parameters that are to be used as part of the accelerated transfer.

Figure 4:
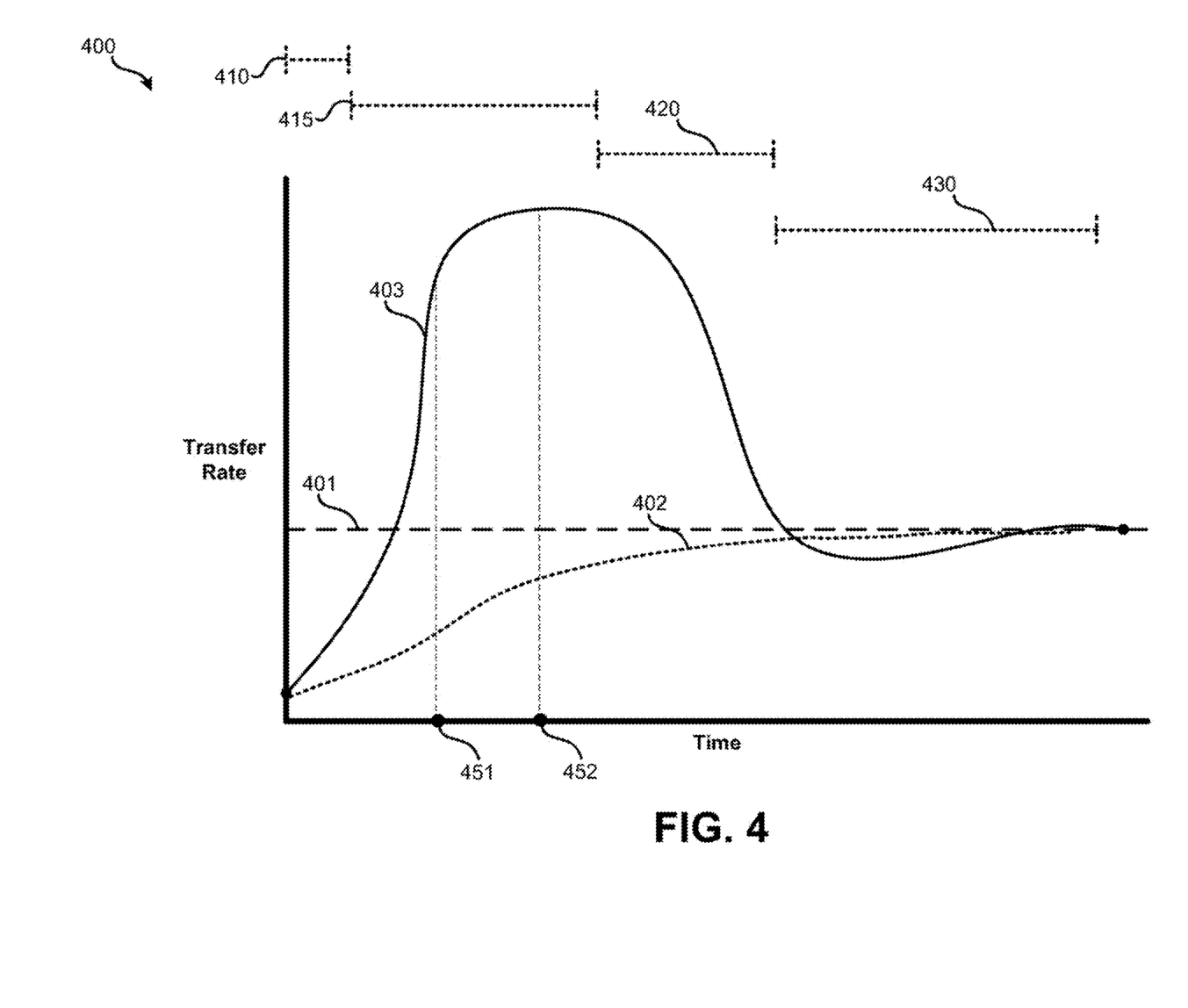
FIG. 4 illustrates an embodiment of data transfer rates adjusted using communication parameters.

FIG. 4 illustrates an embodiment of data transfer rates adjusted using communication parameters that provide an accelerated transfer. Broken line 401 represents a QoS transfer rate that has been set for a particular VSAT. For instance, for home Internet delivery, the QoS transfer rate represented by broken line 401 may represent the transfer rate for which a user pays a monthly subscription fee. In a conventional arrangement, represented by dotted line 402, the transfer rate takes some amount of time before approximately meeting the QoS transfer rate. The initial transfer rate may be significantly below the QoS rate because of propagation delays and an initial handshaking process (which can require data to be exchanged between a satellite gateway and a VSAT). Therefore, for example if at time 451 the average transfer rate is measured, the average transfer rate may be significantly below the QoS rate. Further, even at time 452 if the average transfer rate is measured, the average transfer rate would remain below the QOS rate due to the effect of the initial slow startup of the transfer.

In embodiments detailed herein, exemplified by solid line 403, an accelerated transfer rate is raised above the QoS transfer rate represented by broken line 401; such a transfer is referred to as an accelerated startup transfer. The accelerated transfer may also start below the QoS rate because of propagation delays and an initial handshaking process (which can require data to be exchanged between a satellite gateway and a VSAT). However, by adjusting the parameters of the connections between the VSAT and satellite gateway system and between the satellite gateway system and the content source, the transfer rate can be raised above the QoS transfer rate. Therefore, for example if at time 451 the average transfer rate is measured, the average transfer rate may be near the QoS rate (by the transfer rate above the QoS transfer rate compensating for the initial slow start up due to handshaking and propagation delays). Further, if at time 452 the average transfer rate is measured, the average transfer rate could be above the QOS transfer rate indicated by broken line 401 due to the accelerated transfer rate above the QoS transfer rate (despite the effect of the initial slow startup of the transfer). Therefore, from a user's perspective, if the user is monitoring the transfer rate, the user may be pleased to see that the realized transfer rate is at or above the QoS transfer rate he was expecting.

It should be understood that the transfer rates and times illustrated in FIG. 4 are merely examples intended to illustrate the beneficial effects of an accelerated startup transfer. In other embodiments, the duration, delays, transfer rates, and times can vary.

The accelerated startup transfer exemplified by solid line 403 can be broken up into four phases. In a first phase, such as occurring over time period 410, communication connections between the VSAT, satellite gateway system, and the content provider can be initiated using parameters for a standard communication session. During this phase, sensing may be performed, such as DPI to determine what type of data is being transmitted. The second phase may be entered only if the type of data is determined to be a qualifying type of data.

In a second phase, occurring over time period 415, communication connections between the VSAT, satellite gateway system, and content provider are initiated with parameters that allow for an increased transfer rate without respect to a defined QoS transfer rate for the VSAT. In a third phase, occurring over time period 420, communication connections between the VSAT, satellite gateway system, and content provider are modified with ramped or stepped down parameters that decreases the transfer rate until the defined QoS transfer rate is approximately achieved. In a fourth phase, occurring over time period 430, a steady state is attempted to be realized. In the fourth phase, communication connections between the VSAT, satellite gateway system, and content provider are maintained or set so that the defined QoS transfer rate is approximately achieved. After the connection is closed (e.g., the file is completed being transferred), the transfer may end. A new connection, to transfer new data, may be formed that involves a repeat of the four phases.

Figure 5A:
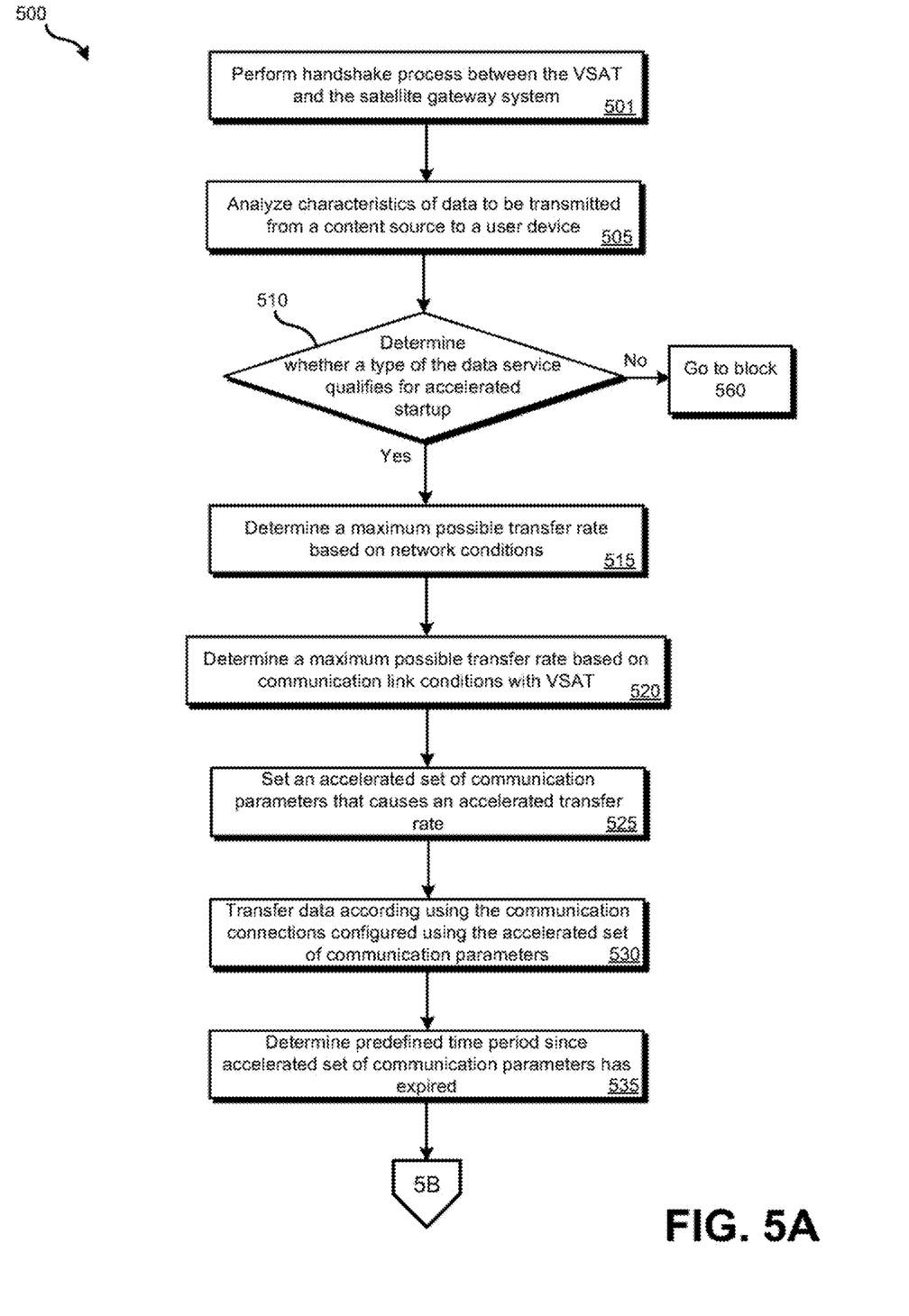
FIGS. 5A and 5B illustrate an embodiment of a method for increasing a transfer rate of a data transfer via satellite.
Figure 5B:
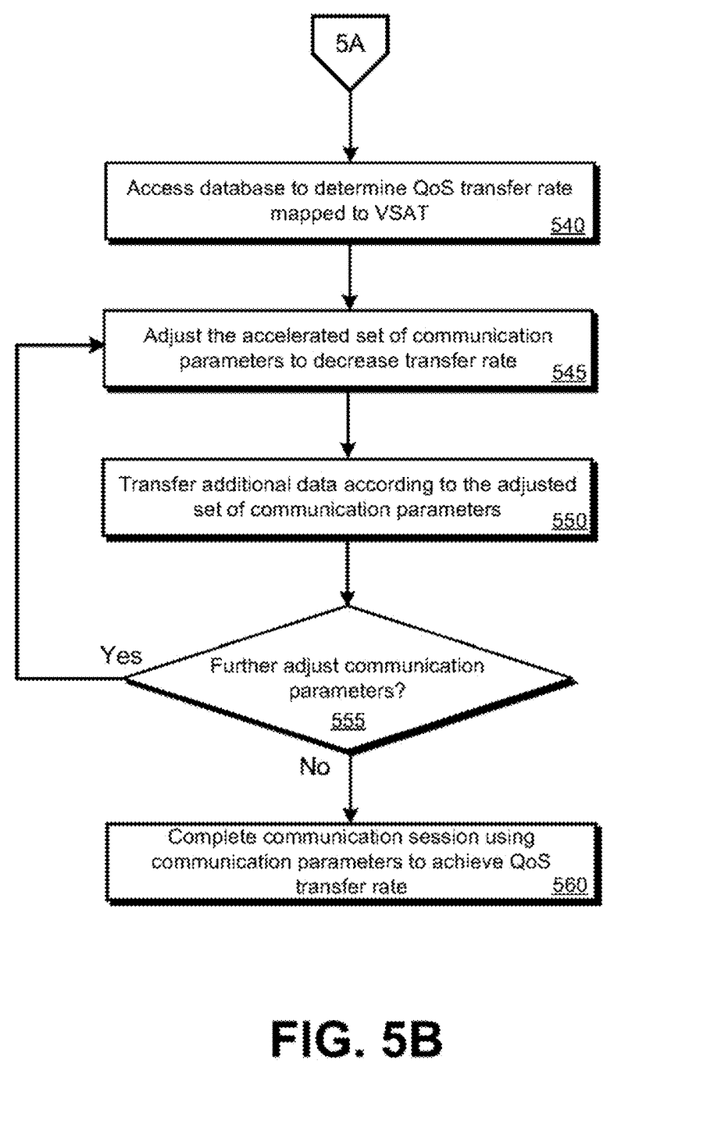

Various methods may be performed using the systems and arrangements of FIGS. 1-4. FIGS. 5A and 5B illustrates an embodiment of a method 500 for increasing the transfer rate of a data transfer via satellite. Each block of method 500 may be performed by the satellite gateway system, such as satellite gateway system 110 of FIGS. 1 and 2.

Method 500 begins on FIG. 5A. At block 501, a handshake process may be performed between the VSAT and the satellite gateway system. This handshaking process may be necessary in order to initiate the communication session to allow a transfer of data from the content source to the VSAT and, ultimately, the user device that requested the data. Due to propagation delays inherent in satellite communication, especially in geosynchronous satellite communication, the handshaking process may take one or more seconds. In order to compensate for this loss of one or more seconds at the beginning of the data transfer, the accelerated startup process may be performed.

At block 505, characteristics of data to be transmitted from a content source to a user device via the satellite gateway system may be analyzed. The analysis of block 505 may be performed using a deep packet inspection (DPI) system. By analyzing the source, frequency, type, size, and other characteristics of data to be transmitted to the user device, the data may be classified as a particular type of data. By virtue of the DPI system performing its analysis after data has started to be received from the content source, at least some portion of the data transmitted to the satellite terminal from the content source may be transmitted before a determination is made as to whether the data transfer should be accelerated. Therefore, acceleration may occur after at least enough data has been received and transmitted to accurately identify the type of data being transmitted to the satellite terminal from the content source. Some data may initially be transmitted to the satellite terminal using standard communication parameters. Once enough data has been transmitted in order to properly identify the type of data, block 510 may be performed.

At block 510, a determination may be made whether the type of data determined at block 505 qualifies for an accelerated startup of a data transfer from the content source to the VSAT or, more generally, the satellite terminal. The determination of block 510 may involve comparing the determined type of data to one or more types of data that have been preselected for accelerated startup. For example, the type of data that has been selected for accelerated startup can include: streaming video, streaming audio, file downloads, and data transfers relating to speed tests for testing the speed of an Internet connection of user device. If block 510 is determined in the negative, method 500 may proceed to block 560 and perform a conventional data transfer in which the parameters set in the transfer rate are set such that a QoS transfer rate mapped to the satellite terminal is used as the target rate throughout the duration of the session.

If block 510 is determined in the affirmative, method 500 may proceed to block 515. At block 515, a determination may be made as to the maximum possible transfer rate available based on network conditions. The network conditions can involve the amount of data being transferred by the satellite gateway system and the satellite to other satellite terminals. The network conditions can also include the amount of data being transferred by the satellite gateway system with various content sources. The greater the amount of traffic between the satellite gateway system and the satellite and/or between the satellite gateway system and various content sources, the lower the maximum possible transfer rate available to the satellite terminal for which the data is to be transmitted.

At block 520, a determination may be made as to a maximum possible transfer rate based on communication link conditions for the particular VSAT or satellite terminal. The communication link conditions may result in a lower forward channel ACM (Adaptive Coding and Modulation) MODCOD value for the VSAT than what may be possible for a given terminal type operating under ideal conditions. A terminal with poorly pointed antenna, or which is currently in a partial rain fade condition, might be using a very inefficient and robust MODCOD value, i.e., one which adds a lot of FEC-forward error correction overhead for each transmitted information bit. In such a case, showing the user an accelerated traffic rate start-up could consume so much bandwidth that a decision may be made to not implement accelerated startup. Also, depending on how bad the link quality is, it might not reach the QoS service rate no matter how much the satellite gateway system tries to accelerate given the available forward carrier bandwidth. The communication link conditions may also result in lost packets, especially when the conditions change quickly before the terminal is able to notify the satellite gateway system about the lower MODCOD value it is using, or due to malfunction in one or more pieces of equipment in the communication link between the satellite gateway system and the VSAT. This also negatively affects the transfer rate possible between the satellite gateway system and the VSAT.

At block 525, an accelerated set of communication parameters may be used to configure communication connections between: 1) the VSAT and the satellite gateway system; and 2) the satellite gateway system and the content source. It should be understood that at least some data may be transmitted before the accelerated set of communication parameters are set due to some amount of data being needed to properly identify the type of data being transmitted. For example, if data is encrypted, secondary characteristics of the data, such as size and frequency of the data, may be used to ascertain what type of data it is. The communication parameters used between the VSAT and the user device may remain unchanged and may represent a typical TCP connection. The second connection between the VSAT and the satellite gateway system may be a proprietary communication connection based on TCP. The third connection between the satellite gateway system and the content source may be a TCP connection for which parameters are adjusted to increase the realized transfer rate to the VSAT. A parameter that may be adjusted at block 530 may include the data window size. The data window size may be increased in order to allow a greater amount of data to be transmitted without an acknowledgment needing to be transmitted back to the content source by the satellite gateway system or back to the satellite gateway system by the VSAT. Other parameters may also be adjusted. Additionally or alternatively, other parameters could include amount of buffer space available to the accelerated connection (e.g., connection buffer 332-1, 332-2), scheduling priority, scheduling weight, number of packets or bytes per scheduling cycle, etc.

The accelerated set of communication parameters set at block 525 may, in some embodiments, be based at least in part on the determined maximum possible transfer rate of block 515 and/or the determined maximum possible transfer rate due to communication link conditions with the VSAT at block 520. That is, the accelerated set of communication parameters set at block 525 may be selected such that an accelerated transfer rate to the VSAT is not attempted that would be limited by other factors, such as network congestion and degraded conditions between the satellite and the VSAT. Therefore, the transfer rate used for the accelerated transfer is based at least in part on the current network conditions in communication link conditions.

The accelerated parameters set at block 525 may not be based on a QoS transfer rate mapped to the VSAT. For example, a VSAT associated with the user account may be mapped to a QoS transfer rate that reflects the subscription level which a user has purchased. The accelerated parameter set up in block 525 may result in an accelerated transfer that is faster over a given period of time than the QoS transfer rate. In some situations, the accelerated parameters may result in the accelerated transfer being as fast as possible given the network conditions and communication link conditions.

At block 530, data may be transferred from the content source to the satellite gateway system and from the satellite gateway system to the VSAT according to the accelerated set of communication parameters set at block 525. While handshaking and propagation delays may still be present, the increased transfer rate resulting from the accelerated set of communication parameters can, over a short period of time, allow the transfer rate to average to being as fast or faster than the QoS transfer rate.

At block 535, a determination may be made that a predefined time period since the accelerated set of communication parameters were set and began being used for data transfer has expired. In some embodiments, the predefined time period may be based on the type of data service identified at block 505. In other embodiments, a set predefined time period may be used for all types of data services. For example, the predefined time period may be between 1 and 20 seconds.

Method 500 continues on FIG. 5B. At block 540, a database may be accessed to determine a QoS transfer rate that is mapped to the VSAT or, more generally, the satellite terminal. The VSAT may be mapped to a user account which in turn is mapped to a QoS transfer rate. This QoS transfer rate reflects the maximum transfer rate that should be provided to the VSAT based on the subscription associated with the VSAT. Block 540 may be performed earlier as part of method 500 and does not necessarily need to be performed following the expiration of the predefined time period.

At block 545, the accelerated set of communication parameters may be adjusted to decrease the transfer rate from the content source to the satellite gateway system and from the satellite gateway system to the VSAT. This can include decreasing the data window size, scheduling priority or weight, or other parameter combination that was set as part of the accelerated set of communication parameters. In some embodiments, block 545 is performed once. In other embodiments, block 545 is performed repeatedly to ramp down or step down the data window size. For a TCP connection, the data window size may only be able to be decreased in certain increments to prevent the connection from being reset.

At block 550, additional data is transferred according to the adjusted set of communication parameters from the content source to the satellite gateway system and from the satellite gateway system to the VSAT. At block 555, if multiple steps down are to be used to adjust the communication parameters to decrease the traffic rate back to the QoS plan rate, method 500 may return to block 545. If only a single adjustment is being made or if the ramp down or step down process is complete, method 500 may proceed to block 560.

At block 560, the communication session may be completed using communication parameters that approximately achieve the QoS transfer rate determined at block 540. For future communication session, method 500 may be repeated.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for increasing a transfer rate of a data transfer via satellite, the method comprising:
   analyzing, by a satellite gateway system, characteristics of data to be transmitted from a content source accessible via the Internet to a satellite terminal;
   determining, by the satellite gateway system, that a type of data service corresponding to the characteristics of the data qualifies for an accelerated startup;
   in response to determining that the type of data service qualifies for the accelerated startup, setting, by the satellite gateway system, an accelerated set of communication parameters that control communication between the satellite gateway system and the satellite terminal via the satellite and between the satellite gateway system and the content source to achieve an accelerated transfer rate between the content source and the satellite terminal;
   transferring a first set of data from the content source to the satellite terminal using the accelerated set of communication parameters;
   after a predefined period of time, decreasing the accelerated transfer rate between the content source and the satellite terminal to meet a predefined transfer rate by adjusting, by the satellite gateway system, the accelerated set of communication parameters to an adjusted set of communication parameters that control communication between the satellite gateway system and the satellite terminal via the satellite and between the satellite gateway system and the content source, wherein:
   the predefined transfer rate is lower than the accelerated transfer rate; and
   transferring a second set of data from the content source to the satellite terminal using the adjusted set of communication parameters.

2. The method for increasing the transfer rate of the data transfer via the satellite of claim 1, wherein the accelerated set of communication parameters comprises one or more of parameters selected from the group consisting of: a data transmission window size, one or more buffer sizes, a queue service rate, a rate of scheduling packets or bytes from one or more queues, and one or more queue scheduling weights.

3. The method for increasing the transfer rate of the data transfer via the satellite of claim 2, wherein the accelerated set of communication parameters comprises a larger data transmission window size for the accelerated transfer rate and the adjusted set of communication parameters comprises a smaller data transmission window size.

4. The method for increasing the transfer rate of the data transfer via the satellite of claim 1, further comprising:
   determining, by the satellite gateway system, a maximum available transfer rate based on network congestion experienced by the satellite gateway system.

5. The method for increasing the transfer rate of the data transfer via the satellite of claim 4, wherein the accelerated set of communication parameters is at least partially determined based on the determined maximum available transfer rate.

6. The method for increasing the transfer rate of the data transfer via the satellite of claim 5, further comprising:
   determining an amount to decrease the determined maximum available transfer rate based on a quality of communication path between the satellite and the satellite terminal, wherein the accelerated set of communication parameters is at least partially determined based on the determined amount to decrease the determined maximum available transfer rate.

7. The method for increasing the transfer rate of the data transfer via the satellite of claim 1, wherein the type of data service is selected from the group consisting of:
a streaming video service; a streaming audio service; a data transfer rate test service; and a file download service.

8. The method for increasing the transfer rate of the data transfer via the satellite of claim 1, wherein analyzing the characteristics of the data to be transmitted from the content source accessible via the Internet to the satellite terminal comprises performing deep packet inspection (DPI).

9. The method for increasing the transfer rate of the data transfer via the satellite of claim 1, wherein adjusting the accelerated set of communication parameters to the adjusted set of communication parameters comprises performing a multi-step transition process that performs multiple step-based adjustments over time to the accelerated set of communication parameters to set the adjusted set of communication parameters.

10. The method for increasing the transfer rate of the data transfer via the satellite of claim 1, wherein at least three separate communication connections are present, the at least three separate communication connections comprising: a first TCP connection between a user terminal and the satellite terminal; a second communication connection between the satellite terminal and the satellite gateway system via the satellite; and a third TCP connection between the satellite terminal and the content source accessible via the Internet.

11. A system for increasing a transfer rate of a data transfer via satellite, the system comprising:
a plurality of satellite terminals; and
a satellite gateway system that communicates with the plurality of satellite terminals via the satellite and serves as a gateway between the plurality of satellite terminals and the Internet, the satellite gateway system configured to:
analyze characteristics of data to be transmitted from a content source accessible via the Internet to a satellite terminal of the plurality of satellite terminals;
determine that a type of data service based on the analyzed characteristics of the data qualifies for an accelerated startup;
in response to determining that the type of data service qualifies for the accelerated startup, set an accelerated set of communication parameters that control communication between the satellite gateway system and the satellite terminal via the satellite and between the satellite gateway system and the content source to achieve an accelerated transfer rate between the content source and the satellite terminal;
transfer a first set of data from the content source to the satellite terminal using the accelerated set of communication parameters;
after transferring the first set of data, decrease the accelerated transfer rate between the content source and the satellite terminal to meet a predefined transfer rate by adjusting the accelerated set of communication parameters to an adjusted set of communication parameters that control communication between the satellite gateway system and the satellite terminal via the satellite and between the satellite gateway system and the content source, wherein:
the predefined transfer rate is lower than the accelerated transfer rate; and
transfer a second set of data from the content source to the satellite terminal using the adjusted set of communication parameters.

12. The system for increasing the transfer rate of the data transfer via the satellite of claim 11, wherein the accelerated set of communication parameters comprises a larger data transmission window size for the accelerated transfer rate and a smaller data transmission window size in the adjusted set of communication parameters.

13. The system for increasing the transfer rate of the data transfer via the satellite of claim 11, wherein the accelerated set of communication parameters that control communication at the accelerated transfer rate are active for a predefined period of time prior to the adjusting of the accelerated set of communication parameters.

14. The system for increasing the transfer rate of the data transfer via the satellite of claim 11, wherein the satellite gateway system is further configured to:
determine a maximum available transfer rate based on network congestion experienced by the satellite gateway system, wherein the accelerated set of communication parameters is at least partially determined based on the determined maximum available transfer rate.

15. The system for increasing the transfer rate of the data transfer via the satellite of claim 14, wherein the satellite gateway system is further configured to:
determine an amount to decrease the determined maximum available transfer rate based on a quality of communication path between the satellite and the satellite terminal, wherein the accelerated set of communication parameters is at least partially determined based on the determined amount to decrease the determined maximum available transfer rate.

16. The system for increasing the transfer rate of the data transfer via the satellite of claim 11, wherein the satellite gateway system comprises a deep packet inspection (DPI) system that analyzes the characteristics of the data to be transmitted from the content source accessible via the Internet to the satellite terminal.

17. The system for increasing the transfer rate of the data transfer via the satellite of claim 11, wherein the satellite gateway system being configured to adjust the accelerated set of communication parameters to the adjusted set of communication parameters comprises the satellite gateway system being configured to:
perform a multi-step transition process that performs multiple step-based adjustments over time to the accelerated set of communication parameters to set the adjusted set of communication parameters.

18. The system for increasing the transfer rate of the data transfer via the satellite of claim 11, further comprising the satellite, wherein the satellite is in geosynchronous orbit and relays data between the plurality of satellite terminals and the satellite gateway system.

19. The system for increasing the transfer rate of the data transfer via the satellite of claim 11, wherein each satellite terminal of the plurality of satellite terminals is a very small aperture terminal (VSAT).

20. The system for increasing the transfer rate of the data transfer via the satellite of claim 19, the system further comprises a plurality of user devices, wherein each satellite terminal of the plurality of satellite terminals communicate with one or more user devices of the plurality of user devices, the plurality of user devices being configured to access the Internet via the satellite gateway system.

* * * * *